United States Patent [19]

Fezza et al.

[11] Patent Number: 5,703,203
[45] Date of Patent: Dec. 30, 1997

[54] REMOVAL OF OLIGOMERS FROM SUBSTANTIALLY CRYSTALLINE, α-OLEFIN POLYMERS

[75] Inventors: Richard J. Fezza, Wilmington; Stephen D. Williams, Newark, both of Del.

[73] Assignee: Montell North America Inc., Wilmington, Del.

[21] Appl. No.: 414,870

[22] Filed: Mar. 31, 1995

[51] Int. Cl.$^6$ .................................................. C08F 6/04
[52] U.S. Cl. ........................................................ 528/483
[58] Field of Search ................................... 528/483, 501

[56] References Cited

U.S. PATENT DOCUMENTS

| | | | |
|---|---|---|---|
| 2,957,859 | 10/1960 | Mertes | 260/93.7 |
| 3,431,250 | 3/1969 | Ratzsch et al. | 260/94.9 |
| 4,233,429 | 11/1980 | Hoerauf et al. | 526/71 |
| 4,314,053 | 2/1982 | Lin et al. | 528/483 |
| 4,365,057 | 12/1982 | Saito et al. | 528/503 |
| 4,529,795 | 7/1985 | Mayer et al. | 528/501 |
| 4,602,082 | 7/1986 | Akiyama et al. | 528/481 |
| 5,047,446 | 9/1991 | DeNicola | 522/157 |
| 5,126,414 | 6/1992 | Cook et al. | 526/68 |
| 5,200,486 | 4/1993 | Beckemeier et al. | 526/352 |
| 5,237,048 | 8/1993 | Miyakawa et al. | 528/483 |

FOREIGN PATENT DOCUMENTS

| | | |
|---|---|---|
| 68146 | 1/1983 | European Pat. Off. . |
| 1272778 | 5/1972 | United Kingdom . |

*Primary Examiner*—Thomas R. Weber

[57] ABSTRACT

Disclosed is a method for removing oligomers from substantially crystalline, α-olefin polymer particles without having to melt the particles. The method comprises fluidizing a bed of the particles with a gas in which the oligomers are soluble, which bed is at a temperature at which the particles are not sticky, but at least lower molecular weight oligomers will evaporate therefrom, and maintaining the particles in the fluidized bed until a substantial portion of the oligomers have evaporated and have been removed from the bed by the fluidizing gas. By regulatng the bed temperature and the residence time of the particles in the bed the proportion and chain length of the oligomers removed can be controlled.

6 Claims, No Drawings

REMOVAL OF OLIGOMERS FROM SUBSTANTIALLY CRYSTALLINE, α-OLEFIN POLYMERS

FIELD OF THE INVENTION

This invention relates to synthetic resins. More particularly, it relates to α-olefin polymers, and the treatment of them to remove undesirable components such as those that occur in their formation.

BACKGROUND INFORMATION

As is well known, α-olefin polymers are made by effecting with catalysts the polymerization of α-olefins under time, temperature and pressure conditions selected to result in polymeric products having desired properties. The intended product in each case, most times simply referred to as polymer, is a blend of molecular strands or chains of α-olefin units, which chains have many different chain lengths. While the lengths of most of the chains represent thousands of carbon atoms, inevitably there are chains of much shorter lengths, which can be as low as two α-olefin units, and as high as forty-five or more α-olefin units. These shorter chain length molecules are referred to as oligomers. In the polymerization reaction, oligomers also are formed apart from the intended polymer. To the extent they do not become part of the intended polymer particles, they usually are separated from the polymer particles in an unreacted α-olefin(s) removal procedure generally performed after the polymerization step or steps. Oligomers also can be formed in a polymer as the result of post-polymerization treatments such as, for example, visbreaking, and the like, including melt extrusion In most commercial α-olefin polymers, the concentration of oligomers in the polymer particles is not enough to cause a problem. Indeed, the presence of oligomers can have a beneficial effect on the melt rheology of the polymers. However, especially in the case of substantially crystalline, propylene polymers with high melt flow rates (>5 dg/min, ASTM D 1238, Condition L) in which the oligomer concentration is frequently in the range of 1000–10,000 parts per million parts by weight of the polymer, a substantial concentration of oligomers in the polymer causes the emission of "smoke" from the polymer when it is melt extruded as when it is being converted into a useful article. See, for example, the U.S. Pat. No. 4,233,429 to Hoerauf et al. which discloses a method and a device for capturing and removing from the work area volatiles evolved from the molten polymer as it emerges from the extruder die. However, not all of the oligomers evolve from the molten polymer after it leaves the die and before it is cooled to the temperature at which it solidifies. The residual oligomers in the extruded polymer can result in objectionable taste and odor in articles (for example, packaging film, containers, and the like) of such extruded polymer.

One method that has been disclosed for reducing the oligomer concentration of a polymer has been to melt the polymer particles and then pass through the melt a liquid or gas in which the oligomers are soluble but the polymer is insoluble. Examples of this method are disclosed in the U.S. Pat. No. 5,200,488 to Beckemeier et al., and the U.S. Pat. No. 5,237,048 to Miyakawa. A major disadvantage of this method is that the resulting purified polymer has a heat history; that is, it has some thermal degradation and changes in physical properties. Such become magnified when the polymer is subjected to further melt procedures such as melt compounding to make resin products, and injection molding, thermoforming, melt spinning, melt casting, and the like, to make useful articles.

Consequently, the basic problem to which this invention provides a solution is how to remove undesired oligomers from an α-olefin polymer without melting it.

DESCRIPTION OF PRIOR ART

The U.S. Pat. No. 4,365,057 to Saito et al. discloses a method for "drying" an α-olefin polymer that has been in a slurry with a 6 to 7 carbon atom hydrocarbon medium, and, after being separated from the slurry, has been treated (as by being contacted with heated nitrogen gas in a conventional dryer such as a fluidized bed dryer) to reduce the concentration of the residual hydrocarbon medium to 0.2–2% by weight. According to the patent, a slurry of this kind can result when the polymer has been formed in such hydrocarbon medium, when it is subjected to catalyst deactivation with an alcohol in such hydrocarbon medium, and when it is treated with such hydrocarbon medium to remove an atactic fraction. The method involves introducing the polymer into the upper part of a silo, introducing nitrogen gas with a dew point of −10° C. or lower into the lower part of the silo, discharging polymer, which, the patent emphasizes, descends by gravity within the silo, from the lower part of the silo, and discharging from the upper part of the silo nitrogen gas containing hydrocarbon medium. The drying is carried out at a temperature of 70°–130° C., the retention time of the polymer in the silo is 0.5–20 hours, and the amount of nitrogen gas introduced is 20–40 Nm$^3$ per ton of polymer treated. The patent does not disclose an aliphatic hydrocarbon medium having 8 or more carbon atoms, it does not refer to oligomers, and it does not describe the polymer powder in the silo as constituting a fluid bed.

The U.S. Pat. No. 5,047,446 to DeNicola discloses a method for the treatment of irradiated propylene polymer particles containing free radicals. In one embodiment the particles are treated by heating them in a bed of the particles fluidized by nitrogen or any other gas inert to the free radicals at about 40°–110° C. for about 10 minutes–two hours. In another embodiment, they are then heated in a second fluid bed at about 130°–150° C. for at least about 20 minutes. The objective of the first step is to better control the recombination of the free radicals; in the particles, while the objective of the second step is to better control the deactivation of residual free radicals. Nothing in this patent appears to suggest that the fluidizing gas from either bed contains oligomers.

SUMMARY OF INVENTION

This invention provides a non-melt method for stripping oligomers from finely divided, solid, substantially crystalline, α-olefin polymer particles containing such at a substantial concentration. In general, the method comprises:

establishing a bed comprising said particles at a temperature sufficient to evaporate oligomers from said particles, but insufficient to cause said particles to become sticky to the extent they tend to substantially agglomerate and to adhere to walls and the like;

fluidizing the bed by passing through said bed at a bed fluidizing velocity a stream of gas inert to the particles and oligomers under prevailing conditions, whereby evaporated oligomers are removed from the bed; and maintaining said bed in its fluidized condition at such a temperature for a period of time sufficient for a substantial portion of said oligomers in said particles to evaporate therefrom and be removed from the bed.

One embodiment of the method is based on the discovery that in general the proportion and chain lengths of oligomers removed in the practice of the method are functions of temperature and residence time of polymer particles in the fluidized bed. It was found that the proportion of oligomers removed is a direct function of the residence time of the polymer particles in the fluidized bed. Further, it was found that the chain length of the oligomers removed is a direct function of the temperature of the polymer particles in the bed.

In this embodiment, the temperature and residence time of the polymer particles in the fluid bed are regulated so as to control both the proportion and the chain length of the oligomers removed from the particles, and thereby provide a polymer product with a residual content of oligomers, the concentration and chain lengths of which are necessary or desired in the use of the product in the manufacture of useful articles, or even in the articles themselves.

DETAILED DESCRIPTION OF THE INVENTION

The polymer treated according to this invention is an α-olefin polymer that is normally solid and non-sticky in a range of practical temperatures, for example, 100°–140° C., and that has a significant concentration of oligomers. Usually, such an α-olefin polymer has enough crystallinity to be solid and non-sticky up to an elevated temperature (a temperature substantially above 25° C.), and to become molten at or above that temperature. As is well known, the temperature at which such a polymer becomes molten is referred to as the melting point. Examples of an α-olefin polymer with this crystallinity include such molding, film and fiber grade polymers as polyethylene, including high, medium and low density types; ethylene copolymers, including linear low density polyethylene and ultralow density polyethylene; polypropylene (propylene homopolymer); copolymers and terpolymers of propylene and other α-olefins such as ethylene, 1-butene, and the like, which terpolymers can include dienes; polybutenes, polystyrene; and the like, including blends of such polymers, which blends are made by sequential polymerization processes or by melt compounding methods.

The oligomer concentration of such α-olefin polymer can be in a broad range. A typical concentration is 1000–10,000 parts by weight per million parts by weight of the polymer, but higher and lower concentrations are within the broader scope of this invention. However, at an initial oligomer concentration below about 250 parts by weight per million parts by weight of the polymer, the process is not very practical. One reason is that reducing concentration of oligomers below this level does not appear to have any useful effect.

According to this invention, the oligomers-bearing, α-olefin polymer to be treated is in the form of solid particles. The degree of oligomer reduction according to this invention does not appear to be significantly affected by particle size. Hence, the polymer particles can be of any practical size. However, in general, they are in a range of 5–200 mesh, (all particle sizes herein are U.S. screen sizes), and preferably, for operational reasons, they are in the range of 5–80 mesh.

Ways and means of establishing and maintaining a fluid bed of particles at a desired temperature, and introducing and withdrawing gas and particles to and from the bed are well known and need not be described here.

The fluidizing and stripping gas can be any gas that is inert to the polymer particles under the prevailing conditions, is a solvent for evaporated oligomers, and is not saturated with oligomers. Preferred examples of the gas are nitrogen, helium, argon, carbon dioxide, and the like. While oxygen and air can be used, in general they are to be avoided because of the risk of dust explosion. The gas preferably has little or no oligomers content when introduced into the bed. In most embodiments of the invention, for reason of economy, gas withdrawn from the bed is recycled. Usually it is treated to separate oligomer vapors therefrom. An example of such treatment is cooling the gas until oligomer vapors therein condense, and separating the condensed oligomers, usually in the form of an oil, from the gas. In these embodiments the gas, after separation of the condensed oligomers, is reintroduced into the bed, usually after it has been reheated to the temperature of the bed.

The temperature of the bed is established and maintained in a range, the upper end of which is dependent on the softening or sticky point of the polymer being treated. The lower end is dependent on the vapor pressures or boiling points of the oligomers to be removed from the polymer. For polypropylene the range is about 100°–140° C. For propylene-ethylene random copolymers in which the polymerized ethylene content is about 2–5% by weight the range is about 100°–125° C.

The residence time of the polymer particles in the fluid bed is dependent on the porosity of the particles, the bed temperature, and the rate of migration at the bed temperature from the interstices of the particles to their surfaces of the highest molecular weight oligomer to be removed therefrom. In general, for most oligomers-bearing, α-olefin polymers in the as-polymerized particle form commonly known as flake, the average particle size of which is about 60 mesh, and such polymers in the as-polymerized spherical particle form, the average particle size of which is about 10 mesh, the residence time is in the range from about 1 hour to about 3 hours for an optimal reduction of oligomers content.

One embodiment of the invention is based on the discovery that, by regulating the bed temperature and the residence time of the polymer particles in the bed, not only the proportion, but also the maximum chain length, of the oligomers stripped from the polymer particles can be significantly controlled. This is advantageous in those instances where a residual concentration of relatively higher molecular weight oligomers in the polymer particles can be tolerated, thus leading to energy savings, or is wanted because of the beneficial effect of such oligomers on the melt rheology of the polymer particles. In general, the higher the bed temperature the higher the chain length, and thus molecular weight, of the oligomers removed, while the longer the residence time, the greater is the proportion of the longer chain length oligomers that is stripped from the polymer particles. Further generalizations are not practical, because so much depends on the circumstances of specific situations. However, in view of the disclosures herein, the combinations of bed temperatures and residence times to obtain optimum concentrations and minimum chain lengths of residual oligomers in the treated polymer particles can be readily determined for each situation without undue experimentation.

The method of this invention can be practiced in batch mode or in continuous mode.

When the method is practiced in the batch mode, the polymer particles to be treated are introduced into a suitable, fluid bed vessel in sufficient quantity to form a static bed therein, the bed is fluidized with oligomer stripping gas, while withdrawing gas that leaves the bed, and the bed temperature is established in the oligomer removal range. The bed is maintained in the fluid state at a temperature in that range until the desired extent of oligomer removal has occurred. In one embodiment of the batch mode practice of the method, introduction of stripping gas into the bed is stopped, the particles either are allowed to cool to a temperature at which they can be handled, and removed from the vessel, or are removed from the vessel and allowed to cool to that temperature. In the more preferred embodiment, the bed is maintained in its fluid condition by the continued introduction of stripping gas into the bed, and withdrawal of gas that has left the bed, while the bed is cooled to a handling temperature, and at such temperature the introduction of stripping gas is stopped and the treated polymer particles are removed from the vessel.

In the continuous mode, a bed of polymer particles to be treated is formed in a suitable, fluid bed vessel, stripping gas is introduced continuously into the vessel at a velocity sufficient to fluidize the bed, the temperature of the bed is established and maintained in the treatment temperature range for that polymer, gas from the bed is continuously removed from the vessel, polymer particles to be treated are introduced continuously into one part or zone of the bed, and polymer particles are continuously removed from another part or zone of the bed. In this mode, the rates of introduction and withdrawal of polymer particles to and from the bed are selected to maintain the bed and to provide the desired average residence time of the particles in the bed.

Features of this invention are illustrated by the following Examples in which "ppm" means parts by weight per million parts by weight of the polymer, and all melt flow rates are per ASTM D 1238, Condition L.

EXAMPLE 1

This Example illustrates the effects of bed temperature and residence time on reduction of the oligomers content of an α-olefin polymer The α-olefin polymer of this example was a semicrystalline polypropylene containing a conventional antioxidant at a conventional concentration. Its nominal melt flow rate was 30 dg/min. Its oligomer content by gas chromatographic analysis was 3220 ppm. The polymer was in the form of spherical particles having the following particle size distribution:

| Particle Size (Mesh) | Percent (By Weight) |
|---|---|
| +5 | 1.1 |
| −5/+10 | 51.5 |
| −10/+14 | 37.2 |
| −14/+35 | 10.2 |
| −35/+140 | 0.0 |
| −140 | 0.0 |

The fluid bed equipment comprised a 46 cm by 46 cm by 61 cm, fluid-bed vessel with a sintered metal diffuser plate. In operative combination with the vessel was a closed loop, recirculating, nitrogen gas system with a gas blower, the name-plate blower speed of which was 1000 scfm, and an in-line fined-tube heat exchanger heated with hot oil. Two sources of hot oil were available, the hot oil of one source being at 80° C., the other being at 140° C. Each source was connected by a valved conduit to a manifold coupled to the heat exchanger so that either source could be selected to feed the heat exchanger.

11.4 Kilograms of the polymer were introduced into the vessel, whereby a static bed was formed, and the bed was fluidized with nitrogen at 80° C. for 120 minutes with samples of the thus treated polymer being withdrawn from the bed every 15 minutes. The gas temperature then was raised to 140° C., and the polymer particles in the fluid bed were treated for an additional 105 minutes, samples of the bed again being taken every 15 minutes. The quantity of nitrogen passed through the fluid bed during the additional 105 minutes was equivalent to 233,333 m³ per metric ton of polymer treated. Gas chromatographic analysis of the samples resulted in the data in the following Table.

TABLE I

| Residence Time In Minutes At 80° C. | Oligomer Concentration (ppm) | Residence Time In Minutes At 140° C. | Oligomer Concentration (ppm) |
|---|---|---|---|
| 15 | 3210 | 15 | 3250 |
| 30 | 3370 | 30 | 3020 |
| 45 | 3130 | 45 | 2820 |
| 60 | 3095 | 60 | 2600 |
| 75 | 3200 | 75 | 2440 |
| 90 | 3080 | 90 | 2340 |
| 105 | 3350 | 105 | 1940 |
| 120 | 3300 | | |

As can be seen, treatment of the polymer for 120 minutes at 80° C. did not significantly reduce its total oligomer concentration from the initial 3220 ppm. On the other hand, treatment at 105 minutes at 140° C. reduced the oligomer concentration by 40% to 1940 ppm.

The following examples illustrate the effects of temperature and residence time not only on the reduction of the total oligomer content. of the α-olefin polymer treated according to this invention, but also on the concentration and chain lengths of the residual oligomers in the polymers after treatment.

In these examples a laboratory size, fluidized bed system was used. A pipe with inside diameter of about 5 centimeters and length of about 0.9 meter, and a porous, sintered metal diffuser plate at its lower end, was the fluidized bed vessel. The vessel wall was temperature controlled with electrical heating tape to a tolerance of +/−3° C., and the fluidization gas stream was preheated with a 1200 watt electric, gas flow-through heater. The fluidization gas temperature was measured with a thermocouple placed about 5 centimeters upstream of the diffuser plate, and the gas temperature was controlled with a feedback controller. Gas flow rates were measured by a Rotometer upstream of the gas heater, and nominally set at 50 scfm for "flake" grade polymers, and at 200 scfm for the spherical particle polymers which had generally larger particle sizes. There was no gas recycle.

In each run of each of these Examples the fluidized bed vessel was charged with 300 grams of untreated polymer, and the resulting bed was fluidized. The fluidizing gas and oligomer stripper was nitrogen. The temperature at which the fluidized bed was established, and the period of time in which the bed was maintained at such temperature, are set forth in the following Tables. At the end of each run, after the treated polymer particles had cooled, the vessel was emptied, and a sample of the polymer particles was taken and analyzed by gas chromatography for total content of oligomers and, except for the 100° C. runs, their carbon atom contents. The gas chromatographic analysis ("GCA") data thus obtained are reported in the following Tables. "nd" in the Tables means: not determined.

EXAMPLE 2

The α-olefin polymer of this Example was a semicrystalline polypropylene with a conventional antioxidant at a conventional concentration. Its nominal melt flow rate was 30 dg/min. The polymer was in the form of spherical particles having the following particle size distribution:

| Particle Size (Mesh) | Percent (By Weight) |
|---|---|
| +5 | 1.1 |
| −5/+10 | 51.5 |
| −10/+14 | 37.2 |
| −14/+35 | 10.2 |
| −35/+140 | 0.0 |
| −140 | 0.0 |

The GCA data obtained are in the following Table II.

TABLE II

| | | Oligomers concentration (ppm) of polymer | | | | | | | |
|---|---|---|---|---|---|---|---|---|---|
| | | | | After Treatment At | | | | | |
| R. Time | Before | 100° C. | | | 120° C. | | | 140° C. | |
| (min.) | Treatment | 2-1 | 2-2 | 2-3 | 2-4 | 2-5 | 2-6 | 2-7 | 2-8 | 2-9 |
| 0 | 2141 | | | | | | | | | |
| 30 | | 1646 | | | 1812 | | | 957 | | |
| 120 | | | 1293 | | | 1077 | | | 350 | |
| 180 | | | | 1129 | | | 762 | | | 180 |
| Carbons: | 9–36 | nd | nd | nd | 15–36 | 18–36 | 21–36 | 12–36 | 24–36 | 27–36 |

EXAMPLE 3

The α-olefin polymer here was a flake grade semicrystalline polypropylene with a conventional antioxidant at a conventional concentration. Its nominal melt flow rate was 30 dg/min. The particle size distribution of the polymer particles was:

| Particle Size (Mesh) | Percent (By Weight) |
|---|---|
| +10 | 0.0 |
| −10/+20 | 4.3 |
| −20/+30 | 8.5 |
| −30/+40 | 35.4 |
| −40/+60 | 39.4 |
| −60/+80 | 7.0 |
| −80/+100 | 2.4 |
| −100/+200 | 0.5 |
| −200 | 2.5 |

The GCA data obtained are in Table III.

EXAMPLE 4

In this Example the α-olefin polymer was a semicrystalline polypropylene with a conventional antioxidant at a conventional concentration, and nominal melt flow rate of 440 dg/min. The polymer was in the form of spherical particles having the following particle size distribution:

| Particle Size (Mesh) | Percent (By Weight) |
|---|---|
| +5 | 0.0 |
| −5/+10 | 61.0 |
| −10/+14 | 31.3 |
| −14/+35 | 7.6 |
| −35/+140 | 0.0 |
| −140 | 0.1 |

Table IV reports the GCA data.

TABLE III

| | | Oligomers concentration (ppm) of polymer | | | | | | | |
|---|---|---|---|---|---|---|---|---|---|
| | | | | After Treatment At | | | | | |
| R. Time | Before | 100° C. | | | 120° C. | | | 140° C. | |
| (min.) | Treatment | 3-1 | 3-2 | 3-3 | 3-4 | 3-5 | 3-6 | 3-7 | 3-8 | 3-9 |
| 0 | 5171 | | | | | | | | | |
| 30 | | 2524 | | | 3830 | | | 3664 | | |
| 120 | | | 2112 | | | 2534 | | | 1277 | |
| 180 | | | | 1927 | | | 2208 | | | 1378 |
| Carbons: | 9–36 | nd | nd | nd | 12–36 | 18–36 | 18–36 | 18–36 | 24–36 | 24–36 |

TABLE IV

| | | Oligomers concentration (ppm) of polymer | | | | | | | | |
|---|---|---|---|---|---|---|---|---|---|---|
| | | After Treatment At | | | | | | | | |
| R. Time | Before | 100° C. | | | 120° C. | | | 140° C. | | |
| (min.) | Treatment | 4-1 | 4-2 | 4-3 | 4-4 | 4-5 | 4-6 | 4-7 | 4-8 | 4-9 |
| 0 | 5343 | | | | | | | | | |
| 30 | | 5066 | | | 4614 | | | 3441 | | |
| 120 | | | 3612 | | | 2474 | | | 1540 | |
| 180 | | | | 3362 | | | 2135 | | | 1109 |
| Carbons: | 12–36 | nd | nd | nd | 15–36 | 18–36 | 18–36 | 18–36 | 24–36 | 27–36 |

EXAMPLE 5

The α-olefin polymer in this Example was a semicrystalline polypropylene with a conventional antioxidant at a conventional concentration. Its nominal melt flow rate was 70 dg/min. The polymer was in the form of spherical particles having this particle size distribution:

| Particle Size (Mesh) | Percent (By Weight) |
|---|---|
| +5 | 0.0 |
| −5/+10 | 25.3 |
| −10/+14 | 44.4 |
| −14/+35 | 29.1 |
| −35/+140 | 0.3 |
| −140 | 0.9 |

Table V reports the GCA data.

EXAMPLE 6

In the runs of this Example the α-olefin polymer was a semicrystalline polypropylene with a conventional antioxidant at a conventional concentration. Its nominal melt flow rate was 20 dg/min. The polymer particles were spherical and had this particle size distribution:

| Particle Size (Mesh) | Percent (By Weight) |
|---|---|
| +5 | 0.0 |
| −5/+10 | 27.3 |
| −10/+14 | 40.8 |
| −14/+35 | 31.0 |
| −35/+140 | 0.1 |
| −140 | 0.8 |

The GCA data that resulted are in Table VI.

TABLE V

| | | Oligomers concentration (ppm) of polymer | | | | | | | | |
|---|---|---|---|---|---|---|---|---|---|---|
| | | After Treatment At | | | | | | | | |
| R. Time | Before | 100° C. | | | 120° C. | | | 140° C. | | |
| (min.) | Treatment | 5-1 | 5-2 | 5-3 | 5-4 | 5-5 | 5-6 | 5-7 | 5-8 | 5-9 |
| 0 | 4627 | | | | | | | | | |
| 30 | | 3655 | | | 2801 | | | 2669 | | |
| 120 | | | 2591 | | | 1592 | | | 978 | |
| 180 | | | | 2392 | | | 1289 | | | 952 |
| Carbons: | 9–36 | nd | nd | nd | 15–36 | 21–36 | 21–36 | 18–36 | 27–36 | 27–36 |

TABLE VI

| | | Oligomers concentration (ppm) of polymer | | | | | | | | |
|---|---|---|---|---|---|---|---|---|---|---|
| | | After Treatment At | | | | | | | | |
| R. Time | Before | 100° C. | | | 120° C. | | | 140° C. | | |
| (min.) | Treatment | 6-1 | 6-2 | 6-3 | 6-4 | 6-5 | 6-6 | 6-7 | 6-8 | 6-9 |
| 0 | 2338 | | | | | | | | | |
| 30 | | 1283 | | | 1267 | | | 1143 | | |
| 120 | | | 1065 | | | 946 | | | 441 | |

TABLE VI-continued

| | | Oligomers concentration (ppm) of polymer | | | | | | | |
|---|---|---|---|---|---|---|---|---|---|
| | | After Treatment At | | | | | | | |
| R. Time | Before | 100° C. | | | 120° C. | | | 140° C. | | |
| (min.) | Treatment | 6-1 | 6-2 | 6-3 | 6-4 | 6-5 | 6-6 | 6-7 | 6-8 | 6-9 |
| 180 | | | | 775 | | | 572 | | | 363 |
| Carbons: | 12–36 | nd | nd | nd | 21–36 | 24–36 | 27–36 | 24–36 | 27–36 | 30–36 |

EXAMPLE 7

The α-olefin polymer in this Example was another flake grade, semicrystalline polypropylene. It also contained a conventional antioxidant at a conventional concentration. The nominal melt flow rate of the polymer was 9.5 dg/min. The particle size distribution of the polymer particles was:

| Particle Size (Mesh) | Percent (By Weight) |
|---|---|
| +10 | 0.0 |
| −10/+20 | 8.1 |
| −20/+30 | 11.5 |
| −30/+40 | 36.1 |
| −40/+60 | 33.6 |
| −60/+80 | 5.9 |
| −80/+100 | 2.0 |
| −100/+200 | 0.2 |
| −200 | 2.7 |

The GCA data obtained are in Table VII.

TABLE VII

| | | Oligomers concentration (ppm) of polymer | | | | | |
|---|---|---|---|---|---|---|---|
| | | After Treatment At | | | | | |
| R. Time | Before | 120° C. | | | 140° C. | | |
| (min.) | Treatment | 7-1 | 7-2 | 7-3 | 7-4 | 7-5 | 7-6 |
| 0 | 2646 | | | | | | |
| 30 | | 2105 | | | 1772 | | |
| 120 | | | 1137 | | | 942 | |
| 180 | | | | 1008 | | | 857 |
| Carbons: | 9–36 | 12–36 | 18–36 | 18–36 | 18–36 | 24–36 | 27–36 |

The foregoing data demonstrate that not only is the method of this invention effective in stripping oligomers from semicrystalline, α-olefin polymer particles, but by regulation of temperatures and bed residence times, the extent of removal of oligomers can be controlled on the basis of their chain length or molecular weight. This is an advantage when retention of the higher molecular weight oligomers in the polymer is desired because of their beneficial effect on the melt rheological properties of the polymer.

Other features, advantages, embodiments, improvements, details and uses within the letter and spirit of the foregoing disclosures, and within the scope of this patent, which is limited only by the following claims construed in accordance with the patent law, including the doctrine of equivalents, will be readily apparent from the disclosures to those exercising ordinary skill in the art. Also, while specific embodiments of the invention have been described in considerable detail, variations and modifications of them can be effected without departing from the spirit and scope of the invention.

What is claimed is:

1. A method for stripping oligomers from finely divided, substantially crystalline, α-olefin polymer particles containing oligomers at a concentration of at least 250 parts by weight per million parts by weight of the polymer, which method comprises:

establishing a bed comprising said particles at a temperature sufficient to evaporate oligomers from said particles, but insufficient to cause said particles to become sticky to the extent they tend to substantially agglomerate and to adhere to walls and the like, fluidizing said bed by passing through said bed at a bed fluidizing velocity a stream of gas inert to said particles and oligomers under prevailing conditions, whereby evaporated oligomers are removed from the bed, and maintaining said particles at a temperature of 100° to about 140° C. for a period of about 1 hour to about 3 hours, sufficient for a substantial portion of said oligomers in said particles to evaporate therefrom, the temperature and period of time being selected according to the proportion and maximum chain length of the oligomers to be stripped from the particles.

2. A method according to claim 1 in which the steps are carried out by introducing into one zone of the bed said polymer particles having oligomers at said concentration of at least 250 parts by weight per million parts by weight of the polymer, and removing from another zone of the bed polymer particles with substantially reduced oligomers concentration.

3. A method according to claim 1 in which said gas is nitrogen.

4. A method according to claim 1 in which said polymer particles are semicrystalline propylene polymer particles.

5. A method according to claim 1 in which the minimum chain length of the oligomers in the polymer particles to be treated by the method is nine carbon atoms.

6. A method according to claim 5 in which the minimum chain length of the oligomers in the polymer particles after treatment by the method is about 18–36 carbon atoms.

* * * * *